United States Patent Office 2,801,968
Patented Aug. 6, 1957

2,801,968

JET TURBINE LUBRICANT

Neal W. Furby, Berkeley, and John M. Stokely and Edward G. Foehr, San Rafael, Calif., assignors to California Research Corporation, San Francisco, Calif., a corporation of Delaware No Drawing. Application September 30, 1953, Serial No. 383,386

2 Claims. (Cl. 252—32.5)

This invention relates to a novel lubricant composition, and it is particularly directed to the provision of a lubricant which is especially suitable for use in jet engines employed in aircraft.

Lubricating oils used in jet engines are subjected to operating conditions so severe that few if any oils are available which are satisfactory in all particulars. The chief causitive factor leading to oil failure in jet aircraft engines is the high temperature—550 to 650° F. or even higher—of many of the surfaces with which the lubricating oil comes in contact. Such temperatures normally induce rapid carbon formation, or coking in the oil and also greatly accelerate oxidative deterioration of the oil in the presence of air. Further, the gear trains employed in jet engines are highly loaded and impose severe scuffing conditions on the lubricant. Since aircraft must operate at abnormally low temperatures such as those encountered in the arctic and at high altitudes, it is also essential that the oil be adapted for use at high as well as low temperatures.

In order for a lubricant to meet the severe operating conditions encountered in jet aircraft service, it is necessary that it possess a number of outstanding characteristics. Thus, the volatility must be low in reference to the viscosity in order to maintain a reasonably low oil consumption rate at high operating temperatures; further, the viscosity-temperature characteristics of the oil must be such as to permit starting of the engine at temperatures well below −50° F., yet give excellent lubrication at the temperatures of 550 to 650° F. encountered in operation. The pour point of the oil must be below −65° F. Since the oil used in gas turbines comes in contact with a variety of metals, it must be non-corrosive to steel, aluminum, magnesium, copper and bronze, and preferably to silver as well. Because of the high gear loadings employed in jet engines, it is necessary that the oil be supplied with additives which impart good E. P. and anti-wear qualities. Further, it is necessary that the oil be supplied with oxidation inhibitor additives as well as with metal deactivating agents in order to combat the deleterious effect of the high temperatures encountered in the engine. There is a wide variance between oils in their response to oxidation inhibitor additives, and it is therefore important not only to employ such additives, but to use as the base fluid an oil which gives a good inhibitor response. Lastly, from the standpoint of engine performance, it is also important that the oil have substantially no foaming tendencies, which quality can be imparted by the addition of an anti-foaming agent.

Aside from the foregoing engine-performance characteristics, it is also of great importance that a jet lubricant have certain other qualities as well. Thus, it should be compatible with and not attack the various rubber packings, rings and hoses, as well as the paint and electrical insulating materials which come into contact with the oil either continuously, or during periods of engine failure or servicing.

It is known that the desired pour point, volatility and temperature-viscosity characteristics required in a jet turbine lubricant can best be met by a synthetic oil rather than by a mineral hydrocarbon oil of natural origin. One of the better synthetic oils for this purpose has been found to be an alkyl diether of poly-1,2-oxypropylene glycol. Unfortunately, however, while this product itself has little tendency to form coke deposits under the elevated temperature conditions encountered in the engine, this is not the case with the composition after it has been supplied with conventional extreme pressure, anti-wear, anti-oxidant, metal deactivator and foam inhibitor additives. While it has been possible to reduce coke formation somewhat by the selection of particular additives, heretofore this has always been at the expense of increased corrosion and wear of the gear surfaces. In summary, prior to the present invention no successful jet turbine lubricant based on a polypropylene glycol was available and resort was necessarily had to oils based on diesters of aliphatic dibasic acids such as the various adipates and sebacates. However, these diester products, while giving satisfactory engine-performance characteristics, are incompatible with the various rubbers, paints and insulating materials employed in the engine, and are particularly troublesome in that they induce severe swelling of the rubber hoses and other rubber elements encountered by the oil.

Accordingly, it is the object of this invention to provide a jet engine lubricant which not only gives good engine performance and has the required pour point, volatility and temperature-viscosity characteristics, but which also is compatible with (i. e., without effect on) the various items of rubber, paint, and insulation and the like with which the oil may come in contact.

It is our discovery that the foregoing objects are obtained by utilizing a jet engine lubricant composition having a base fluid made up of an alkyl diether of poly-1,2-oxypropylene glycol, to which fluid are supplied certain oxidation inhibitor, anti-wear, extreme pressure, metal deactivating and anti-foaming additives of the type defined in succeeding paragraphs. The resulting compositions not only have the desired pour point, volatility and temperature-viscosity characteristics, but also the other engine performance characteristics desired, including relatively good non-coking tendencies, as well. Further, these compositions are substantially non-reactive with the various rubber, paint and electrical insulating materials employed in the engine. They also have the desirable attribute of being compatible in all proportions with low or high viscosity hydrocarbon aircraft oils as well as with the diester type of synthetic oils, thereby permitting blending with said other types of oils under emergency conditions without harm to the engine.

The present composition is made up in major proportion, preferably from about 90 to 98%, of an alkyl diether of poly-1,2-oxypropylene glycol, or a mixture of said diethers, of the type having the general formula

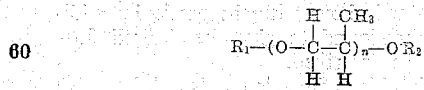

where $n$ is a number having an average value of at least 4, and where $R_1$ and $R_2$, which may be the same or different from one another, represent alkyl groups of from 1 to 18 carbon atoms each. These glycol diethers, which can be prepared by any of the methods known in the art for synthesizing compounds of this general character, have a molecular weight, or average molecular weight, between about 350 and 700. Preferably said compounds have a pour point below about −65° F., a flash point above about 350° F., a viscosity between about 5,000 and 12,000 cs. at −65° F. and between about 2.5 and 3.5 cs.

at 210° F., these figures all being determined in the absence of any additive, or compounding ingredients.

In general, the products recovered by a practice of the more conventional methods will represent mixtures of varying general length and molecular configuration. Accordingly, the data given above and elsewhere herein is to be taken as describing either individual propylene glycol diethers or mixtures of said compounds in which latter case the data given herein refer to the average values evidenced by the mixture as a whole.

The alkyl diether poly-1,2-oxypropylene glycol base fluids employed in forming the lubricant compositions of the present invention are normally prepared by reacting 1,2-propylene oxide with a minor amount (usually from about 8 to 20 mole percent) of a monohydric aliphatic alcohol in the presence of an alkaline catalyst. Following the completion of this reaction, the resulting polymerization product is etherified so as to replace the terminal hydroxy group by an alkoxy radical, thereby forming the diether. The alcohol reacted with the 1,2-propylene oxide is a primary or secondary monohydric alcohol such as methanol, ethanol, n-propanol, 2-propanol, n-butanol, 2-methylpropanol, 2-butanol, n-pentanol, 3-methylbutanol, 2-methylbutanol, n-hexanol, 2-ethylbutanol, 2-methylpentanol, 3-methylpentanol, n-heptanol, 2-methylhexanol, 2,2-dimethylpentanol, n-octanol, 2-ethylhexanol, "isooctyl alcohol" (a $C_8$ alcohol prepared by way of the Oxo synthesis), n-decanol, n-dodecanol, or the like. Generally speaking, any alcohol having a pour point below about 75° F. can be reacted with the propylene oxide to produce a material which, when converted to the diether, will have a pour point below —65° F. If desired, mixtures of two or more alcohols can be employed, thereby producing a mixture of polymeric material having different alkyl groups attached at the one end of the molecular chain. Preferably the alcohol employed to initiate the reaction is one of branched-chain configuration having from 4 to 8 carbon atoms.

The product obtained by reacting 1,2-propylene oxide with an alcohol of the type described above normally comprises a mixture of polymeric monoethers having the general structure

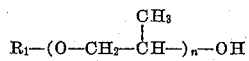

where $R_1$ is the hydrocarbon portion of the alcoholic reactant. The diethers of the present invention can then be prepared by replacing the terminal hydroxyl group of the above structural formula with an alkoxy radical containing from 1 to 18 carbon atoms, though preferably from 1 to 3 carbon atoms. This etherification can be effected by reacting the monoether, or mixture of monoethers, with a suitable alkyl sulfate in the presence of caustic, though the reaction is preferably effected by first reacting the monoether with a dispersion of metallic sodium to convert the polymer to the corresponding sodium salt and then reacting the salt with the desired alkyl chloride.

The lubricant compositions of the present invention are prepared by combining the diether polymeric material of the type defined above with the particular additives which have been found to give the desired final product, as will now be described.

As the oxidation inhibitor there is employed from 0.2 to 5%, and preferably from 0.5 to 3%, by weight, of a compound selected from the group consisting of phenyl-α-naphthylamine, phenothiazine and the dialkyl selenides such as dihexyl selenide, didodecyl selenide, hexyl dodecyl selenide, di(2-ethylhexyl) selenide, dioctadecyl selenide, isooctyl hexadecyl selenide, and the like, wherein the alkyl groups attached to the selenium atom contain from 6 to 18 carbon atoms each. Of these inhibitors, the preferred compound is phenyl-α-naphthylamine.

The extreme pressure additive is employed in the amount of from 0.05 to 1%, and preferably of from 0.1 to 0.5%, by weight. This compound is selected from the group consisting of alkylamine salts of acid alkyl esters of phosphoric acid and blends of said salts with acid alkyl esters of phosphoric acid in which the amine salt constitutes at least 25% by weight, the alkyl groups here referred to containing from 8 to 18 carbon atoms each. Suitable additives coming within this group are dodecylamine dodecyl acid phosphate, blends made up of from 25 to 95% of dodecylamine dodecyl acid phosphate and from 75 to 5% of dodecyl dihydrogen phosphate, octylamine dioctyl phosphate, di(decylamine) dodecyl phosphate, hexadecylamine dodecyl acid phosphate, octadecylamine dioctadecyl phosphate, and blends containing 2-ethylhexylamine 2-ethylhexyl acid phosphate and 2-ethylhexyl dihydrogen phosphate in equal proportions. A preferred extreme pressure additive is a blend made up of an alkylamine acid alkyl phosphate with an alkyl dihydrogen phosphate, in which blend the amine salt component is present to the extent of from 25 to 95% by weight.

The anti-wear additive is present in the amount of from 0.5 to 5% and is a compound selected from the group consisting of neutral aryl phosphates and neutral alkyl aryl phosphates. Representative additives coming within this grouping are triphenyl phosphate, tricresyl phosphate, butyl diphenyl phosphate, phenyl dibutyl phosphate, benzyl dicresyl phosphate, trixylyl phosphate and diphenyl cresyl phosphate. A preferred additive of this class is tricresyl phosphate.

The metal deactivator additive, which is present in the amount of from 0.005 to 0.2%, and preferably from 0.01 to 0.1%, by weight, is a compound selected from the group consisting of quinizarin, alizarin, purpurxanthrene, anthrarufing, and chrysazin. The preferred additive of this class is quinizarin.

As the foam inhibitor there is employed from 0.0001 to 0.02% of a di(lower alkyl)silicone polymer such as dimethyl silicone, diethyl silicone, methyl ethyl silicone and methyl pentyl silicone. The preferred additive of this class is dimethyl silicone.

The lubricant composition of the present invention is illustrated in various of its embodiments by the examples given in the table below, where the make-up of several compositions is given along with data as to their physical properties.

In the case of Examples I and III, the base fluid was a methyl sec.-butyl diether of poly-1,2-oxypropylene glycol having a molecular weight of about 475, viscosities of 13,000 cs., 11.5 cs. and 3.31 cs. at —65° F., 100° F. and 210° F., respectively, and a flash point of 365° F. The base fluid of Example II was a methyl sec.-butyl diether of 1,2-oxypropylene glycol having an average molecular weight of about 425, viscosities of 7700 cs., 9.6 cs. and 2.87 cs. at —65° F., 100° F., and 210° F., respectively, and a flash point of 385° F. The coking test referred to in the table is one wherein the oil in a bath maintained at a constant level is splashed against an overhead inclined plate maintained at a temperature of 600° F. by steel wires on a shaft partially immersed in said oil and rotated at a speed of 1050 R. P. M. The coking value is obtained by measuring the weight of deposit formed on the under side of said plate in mgs. during the 10 hour test period. The load carrying capacity of the lubricant is determined by two tests, one of which is the conventional Falex E. P. Test wherein the conventional machine is operated at 300 R. P. M. at a temperature of 70° F., with the load at failure being recorded in pounds, while the other test (which is considered to be a particularly significant one), the Ryder Four Square Test, wherein there is employed a machine described in A. S. T. M. Bulletin 148 for October, 1947. In this test the machine is run at 10,000 R. P. M. and the gears therein are progressively loaded at a rate of 386.5 lbs./in. of gear width each ten minutes. The oil flow is adjusted at 200 cc./min. at an inlet temperature of 165° F. After each load increment the wearing surfaces are inspected, and the scuff point is defined at the tooth load (in terms of lbs./sq. in. of face width) at which 22.5% of the total tooth face area is scuffed.

| Composition | Viscosity (cs.) | | | Flash Point, °F. | Coking Test (mgs.) | Falex E. P. Test (lbs.) | Ryder Four Square Gear Test (lbs.) | Pour Point, °F. |
|---|---|---|---|---|---|---|---|---|
| | −65° F. | 100° F. | 210° F. | | | | | |
| *Example I* <br> Methyl sec.-butyl diether of— <br> 96.88% poly-1, 2-oxypropylene glycol <br> 0.06% dodecylamine dodecyl acid phosphate <br> 0.04% dodecyl dihydrogen phosphate <br> 2.0% tricresyl phosphate <br> 1.0% phenyl-α-naphthylamine <br> 0.02% quinizarin <br> 0.001% dimethyl silicone <br> (Non-corrosive to steel, aluminum, magnesium, copper and silver.) | 18,680 | 12.0 | 3.33 | 365 | 340 | 3,900 | 1,250 | below −75. |
| *Example II* <br> Methyl sec.-butyl diether of— <br> 96.78% poly-1, 2-oxypropylene glycol <br> 0.12% dodecylamine dodecyl acid phosphate <br> 0.08% dodecyl dihydrogen phosphate <br> 2.0% tricresyl phosphate <br> 1.0% phenyl-α-naphthylamine <br> 0.02% quinizarin <br> 0.001% dimethyl silicone <br> (Non-corrosive to steel, aluminum, magnesium, copper and silver.) | 12,800 | 10.56 | 3.12 | 385 | 340 | 4,500 | 1,300 | below −80. |
| *Example III* <br> Same composition as Example I above except 2% di-2-ethylhexyl selenide substituted for 1% phenyl-α-naphthylamine. | 19,000 | 13.1 | 3.42 | 365 | 60 | 3,600 | 2,050 | below −75. |

We claim:

1. A lubricant composition made up of from about 90 to 98% by weight of a methyl sec.-butyl diether of poly-1,2-oxypropylene glycol having a molecular weight between about 315 and 700, from 0.5 to 3% by weight of a dialkyl selenide wherein the alkyl groups each contain from 6 to 18 carbon atoms, from 0.1 to 0.5% by weight of a blend of dodecylamine dodecyl acid phosphate and dodecyl dihydrogen phosphate wherein the dodecylamine salt constitutes from 25 to 95% by weight, from 0.5 to 5% by weight of tricresyl phosphate, from 0.01 to 0.1% by weight of quinizarin and from 0.0001 to 0.02% by weight of dimethyl silicone.

2. A lubricant composition made up of from about 90 to 98% by weight of a methyl sec.-butyl diether of poly-1,2-oxypropylene glycol having an average molecular weight of about 475, from 0.5 to 3% by weight of di-2-ethylhexyl selenide, from 0.1 to 0.5% by weight of a blend of dodecyl amine dodecyl acid phosphate, and dodecyl dihydrogen phosphate wherein the dodecylamine salt constitutes from 25 to 95% by weight, from 0.5 to 5% by weight of tricresyl phosphate, from 0.01 to 0.1% by weight of quinizarin and from 0.0001 to 0.02% by weight of dimethyl silicone.

References Cited in the file of this patent

UNITED STATES PATENTS

| | | |
|---|---|---|
| 2,285,853 | Downing | June 9, 1942 |
| 2,375,007 | Larsen | May 1, 1945 |
| 2,420,953 | Hunt | May 20, 1947 |
| 2,425,755 | Roberts | Aug. 19, 1947 |
| 2,672,447 | Stewart | Mar. 16, 1954 |
| 2,717,242 | Foehr | Sept. 6, 1955 |

FOREIGN PATENTS

| | | |
|---|---|---|
| 601,419 | Great Britain | May 5, 1948 |